US012801473B2

(12) United States Patent
Seletskiy et al.

(10) Patent No.: US 12,801,473 B2
(45) Date of Patent: Nov. 17, 2026

(54) SYSTEMS AND METHODS FOR CRASH ARTIFACT STORAGE AND RETRIEVAL

(71) Applicant: Cloud Linux Software Inc., Estero, FL (US)

(72) Inventors: Igor Seletskiy, Palo Alto, CA (US); Aleksandr Nesterenko, Vidnoye (RU)

(73) Assignee: Cloud Linux Software Inc., Estero, FL (US)

( * ) Notice: Subject to any disclaimer, the term of this patent is extended or adjusted under 35 U.S.C. 154(b) by 85 days.

(21) Appl. No.: 19/016,170

(22) Filed: Jan. 10, 2025

(65) Prior Publication Data

US 2026/0203153 A1 Jul. 16, 2026

(51) Int. Cl.
*G06F 11/07* (2006.01)

(52) U.S. Cl.
CPC ...... *G06F 11/0778* (2013.01); *G06F 11/0787* (2013.01)

(58) Field of Classification Search
CPC .......................... G06F 11/0778; G06F 11/0787
USPC .................................................. 714/38.11, 48
See application file for complete search history.

(56) References Cited

U.S. PATENT DOCUMENTS

| | | | | |
|---|---|---|---|---|
| 11,663,064 B1 * | 5/2023 | Kagan | G06F 9/45558 | 714/45 |
| 2009/0024820 A1 * | 1/2009 | Ponnuswamy | G06F 11/0778 | 711/170 |
| 2016/0378579 A1 * | 12/2016 | Zhao | G06F 11/0748 | 714/37 |
| 2019/0056985 A1 * | 2/2019 | Farkas | G06F 11/0712 | |
| 2019/0243701 A1 * | 8/2019 | Kurts | G06F 9/3861 | |
| 2021/0064457 A1 * | 3/2021 | Paranjape | G06F 40/205 | |
| 2023/0071884 A1 * | 3/2023 | Slindee | G07C 5/008 | |

FOREIGN PATENT DOCUMENTS

WO WO-2025062448 A1 * 3/2025 ......... H04L 41/0859

* cited by examiner

*Primary Examiner* — Chae M Ko
(74) *Attorney, Agent, or Firm* — ArentFox Schiff LLP; Michael Fainberg

(57) ABSTRACT

A system identifies one or more designated memory areas for temporary crash data storage using at least one predefined rule. In response to detecting a system failure event, the system captures and writes crash data to the one or more designated memory areas, wherein the system failure event triggers a reboot. Subsequent to the reboot, the system retrieves the crash data from the one or more designated memory areas. The system performs an integrity check on the retrieved crash data. In response to determining that the integrity check is successful, the system stores the retrieved crash data in a file system.

18 Claims, 4 Drawing Sheets

100

200

SYSTEMS AND METHODS FOR CRASH ARTIFACT STORAGE AND RETRIEVAL

FIELD OF TECHNOLOGY

The present disclosure relates to the field of crash reporting mechanisms, and, more specifically, to systems and methods for capturing crash artifacts in environments where traditional crash dump solutions are unavailable or infeasible, such as in certain cloud instances.

BACKGROUND

Maintaining system uptime and reliability is a priority in diverse computing environments, from enterprise data centers to cloud-based services. High availability and consistent performance are critical for meeting user expectations and business requirements. However, achieving these goals is often complicated by the need to effectively capture and analyze crash data during system failures.

In traditional on-premises environments, tools like "kdump" are commonly used to collect kernel crash dumps, providing valuable insights into the causes of system failures. These tools enable administrators to quickly diagnose and address issues, minimizing downtime and maintaining service continuity. However, in cloud environments, where infrastructure is abstracted and virtualized, implementing such traditional crash data collection methods can be challenging due to the dynamic and distributed nature of the cloud services.

The absence of comprehensive crash data in cloud environments can significantly impede troubleshooting efforts, leading to prolonged system outages and increased operational costs. Without detailed insights into the root causes of failures, IT teams may struggle to identify and resolve issues promptly, resulting in extended downtime and potential service disruptions. This lack of visibility may also hinder proactive measures to prevent future incidents, as patterns and anomalies in system behavior may go unnoticed.

SUMMARY

To address the shortcomings described previously, the present disclosure describes systems and methods for capturing crash artifacts. More specifically, the presented approach includes a method for capturing and preserving crash artifacts in the event of system issues using a crash reporting system.

The method involves first defining rules for calculating addresses where crash data is to be stored (e.g., CRASHREPORT_METHOD=BUDDY_ALLOCATOR). The assumption is that after a crash, a warm reboot (a process that restarts the system without completely powering down) will occur in which memory contents are preserved due to continuous power, or consistent memory allocation by a hypervisor will occur. The crash reporting system of the present disclosure takes advantage of this by writing crucial crash data (e.g., call trace records, state of CPU registers, executable instructions opcodes, etc.) to specific memory areas across multiple locations in physical memory. For example, in the event of a system panic or oops, the crash reporting system may activate a log dumper.

The associated addresses of these specific memory areas are calculated using the previously defined rules. For example, the specific memory areas may be the last three pages of each memory allocator's list across all NUMA nodes. Pages refer to fixed-size blocks of memory that the operating system uses to manage and allocate memory efficiently. Typically, a page is a contiguous block of memory, often 4 KB in size, which serves as the basic unit of data transfer between the physical memory and storage.

After the system reboots, the crash reporting system scans these memory areas to retrieve the saved crash data. In some aspects, the retrieved data undergoes integrity checks using, for example, the CRC32 algorithm. If successful, the data is saved to a text file in the file system. To prevent redundancy, the system clears any remaining signatures from the memory areas, ensuring that the same artifacts are not saved repeatedly.

In one exemplary aspect, the techniques described herein relate to a method for crash artifact storage and retrieval, the method including: identifying one or more designated memory areas for temporary crash data storage using at least one predefined rule; in response to detecting a system failure event, capturing and writing crash data to the one or more designated memory areas, wherein the system failure event triggers a reboot; subsequent to the reboot, retrieving the crash data from the one or more designated memory areas; performing an integrity check on the retrieved crash data; and in response to determining that the integrity check is successful, storing the retrieved crash data in a file system.

In some aspects, the techniques described herein relate to a method, further including preventing redundant data storage by clearing signatures of the crash data from the one or more designated memory areas.

In some aspects, the techniques described herein relate to a method, wherein the signatures include one or more of: data integrity markers, unique identifiers, metadata, and security tokens of the crash data.

In some aspects, the techniques described herein relate to a method, wherein the one or more designated memory areas are located across a plurality of nodes in a computing environment, and wherein the system failure event occurs at a first node of the plurality of nodes.

In some aspects, the techniques described herein relate to a method, wherein the one or more designated memory areas are a set of pages in each memory allocator list across all the plurality of nodes.

In some aspects, the techniques described herein relate to a method, wherein the set of pages are pages at an end of each memory allocator list.

In some aspects, the techniques described herein relate to a method, wherein the reboot is a warm reboot on a computing device.

In some aspects, the techniques described herein relate to a method, wherein the reboot is a guest operating system reboot of a virtual machine and a hypervisor performs consistent memory allocation for the virtual machine.

In some aspects, the techniques described herein relate to a method, wherein the retrieved crash data is stored in a storage location within the file system as selected by a user.

In some aspects, the techniques described herein relate to a method, wherein the system failure event is a system panic.

It should be noted that the methods described above may be implemented in a system comprising at least one hardware processor and memory. Alternatively, the methods may be implemented using computer executable instructions of a non-transitory computer readable medium.

In some aspects, the techniques described herein relate to a system for crash artifact storage and retrieval, including: at least one memory; and at least one hardware processor coupled with the at least one memory and configured, individually or in combination, to: identify, in the at least one memory, one or more designated memory areas for temporary crash data storage using at least one predefined rule; in response to detecting a system failure event, capture and write crash data to the one or more designated memory areas, wherein the system failure event triggers a reboot; subsequent to the reboot, retrieve the crash data from the one or more designated memory areas; perform an integrity check on the retrieved crash data; and in response to determining that the integrity check is successful, store the retrieved crash data in a file system.

In some aspects, the techniques described herein relate to a non-transitory computer readable medium storing thereon computer executable instructions for crash artifact storage and retrieval, including instructions for: identifying one or more designated memory areas for temporary crash data storage using at least one predefined rule; in response to detecting a system failure event, capturing and writing crash data to the one or more designated memory areas, wherein the system failure event triggers a reboot; subsequent to the reboot, retrieving the crash data from the one or more designated memory areas; performing an integrity check on the retrieved crash data; and in response to determining that the integrity check is successful, storing the retrieved crash data in a file system.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for crash reporting in computing environments. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
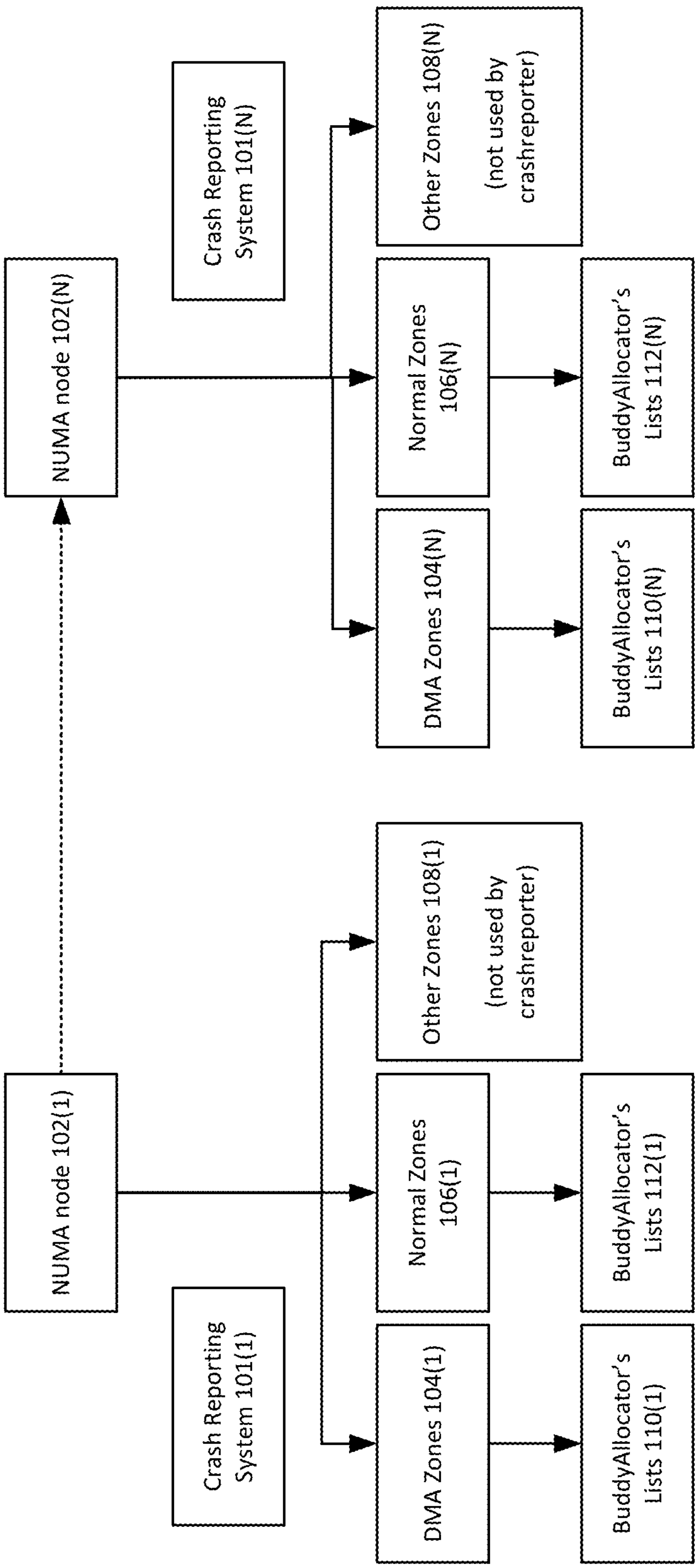
FIG. 1 is a block diagram illustrating a system for capturing crash artifacts.

FIG. 1 is a block diagram illustrating system 100 for capturing crash artifacts. Firstly, FIG. 1 illustrates designated memory areas across a plurality of nodes. A NUMA (Non-Uniform Memory Access) node, as shown in FIG. 1, is a component of a multiprocessor system architecture where memory access times vary based on the memory's proximity to a processor. In this setup, processors are organized into nodes, each with its own local memory, allowing for faster access compared to memory located in other nodes. This local memory access reduces latency and increases bandwidth, enhancing performance. However, accessing memory from other nodes, known as remote memory access, is slower due to the need to traverse interconnects, which can introduce latency.

In FIG. 1, only two NUMA nodes are shown for simplicity, but any number of NUMA nodes may be included. For example, if N is 100, there may be 100 nodes. NUMA node 102(1) includes direct memory access (DMA) zones 104(1), normal zones 106(1), and other zones 108(1). Similarly, NUMA node 102(N) includes DMA zones 104(N), normal zones 106(N), and other zones 108(N). Memory zones are segments of physical memory that the operating system uses to manage different types of memory. In many operating systems (e.g., based on the Linux kernel), memory is divided into zones to handle different allocation requirements and constraints. DMA zones 104(1) and 104(N) are used for memory that must be accessible by devices using DMA. Normal zones 106(1) and 106(N) are standard zones for regular memory allocations.

When a program requests memory, the memory allocator of the program uses its list to find a suitable block. A memory allocator's lists refer to the data structures used by memory management systems to keep track of free and allocated memory blocks. These lists are used for efficiently managing dynamic memory allocation and deallocation in programming environments. The operating system then maps this block to a specific memory zone based on the allocation requirements. For example, on NUMA node 102(1), if a device requires DMA access, the memory allocator will ensure that the allocated block comes from DMA zone 104(1).

Each memory allocator's lists are also depicted in FIG. 1, indicating where crash data is written (e.g., BuddyAllocator's Lists 110(1), 112(1), 110(N), 112(N)). Crash reporting system 101(1) and crash reporting system 101(N) interact specifically with these areas, avoiding others (e.g., other zones 108(1)) not used by the crash reporting systems during the crash data writing phase. For example, during a system panic, crash reporting system 101(1) may store crash data in each of the lists 110(1) and lists 112(1). During recovery, crash reporting system 101(1) may retrieve the written crash data from each of the lists 110(1) and lists 112(1), but may avoid lists associated with other zones 108(1).

In an exemplary aspect, the crash reporting system of the present disclosure is specifically registered with the operating system kernel to manage situations where a system panic leads to a warm reboot or when the hypervisor consistently allocates memory after rebooting a guest operating system. This integration means that the crash reporting system is not merely an external tool but is registered within the kernel itself, allowing it to operate at a low level with direct access to critical system functions and memory management processes.

The crash reporting system is designed to capture and retain crucial diagnostic information during a warm reboot, ensuring that data necessary for post-mortem analysis is not lost. Additionally, in virtualized environments where a hypervisor manages multiple guest operating systems, the crash reporting system is configured to capture and retain the crucial diagnostic information using the consistent memory allocations made by a hypervisor even after a guest OS reboots. This capability is used for maintaining data integrity and continuity across reboots, allowing for accurate crash analysis and troubleshooting. By being registered with the kernel, the crash reporting system can efficiently manage these scenarios, providing robust support for system recovery and analysis in complex computing environments.

As mentioned previously, the crash reporting system may utilized predefined rules to determine where crash data is to be stored. There are various types of predefined rules that may be applied.

Memory alignment rules ensure that memory areas used for crash data storage are aligned to specific boundaries, such as 4 KB or 8 KB, to enhance access speed and reliability.

Priority-based allocation rules may direct the crash reporting system to assign higher priority to memory areas less likely to be overwritten or corrupted during a crash, particularly those reserved for system-critical processes.

Redundancy and mirroring rules may direct the crash reporting system to utilize redundant memory areas across different physical memory modules to maintain data integrity, even if one module fails.

Dynamic allocation rules may be based on load and direct the crash reporting system to adjust the specific memory areas used for crash data according to the current system load or memory usage patterns, ensuring the most stable and available memory is utilized. Allocating memory areas for crash data that are physically closer to the CPU cores likely involved in the crash reduces latency in data writing. Incorporating non-volatile memory areas, such as NVRAM, ensures that crash data persists even if the system loses power.

Segmentation by functionality rules may direct the crash reporting system to divide memory areas based on the type of crash data, such as call traces, CPU states, and opcodes, facilitating easier data retrieval and analysis. Historical data analysis leverages past crash data to identify reliable memory areas for future storage.

Cross-NUMA node balancing rules may direct the crash reporting system to distribute crash data storage evenly across NUMA nodes to prevent any single node from becoming a bottleneck or point of failure.

Time-based rotation rules may direct the crash reporting system to implement a controlled overwriting of older data to make room for new data, ensuring efficient use of memory resources.

During a panic, the crash reporting system records the data required for crash analysis to specific memory areas (the last three pages of each memory allocator's list) based on the predefined rules, anticipating that these memory areas will retain their data post-reboot (i.e., these memory areas are less likely to be overwritten during the reboot process, thereby preserving the crash data for subsequent analysis). For example, crash reporting system 101(1) may record crash data to DMA zones 104(1) and more specifically to the last three pages of BuddyAllocator's Lists 110(1).

In this example, the choice of the last three pages of each memory allocator's list is deliberate, as these pages may be less utilized and thus more likely to remain intact across a system restart. By storing crash data in these locations, the system increases the likelihood that the information will survive the reboot, allowing system administrators and developers to retrieve and analyze it once the system is back online. This preserved data can include details such as the state of the processor registers, memory contents, and the call stack at the time of the crash, all of which are critical for understanding what went wrong.

Figure 2:
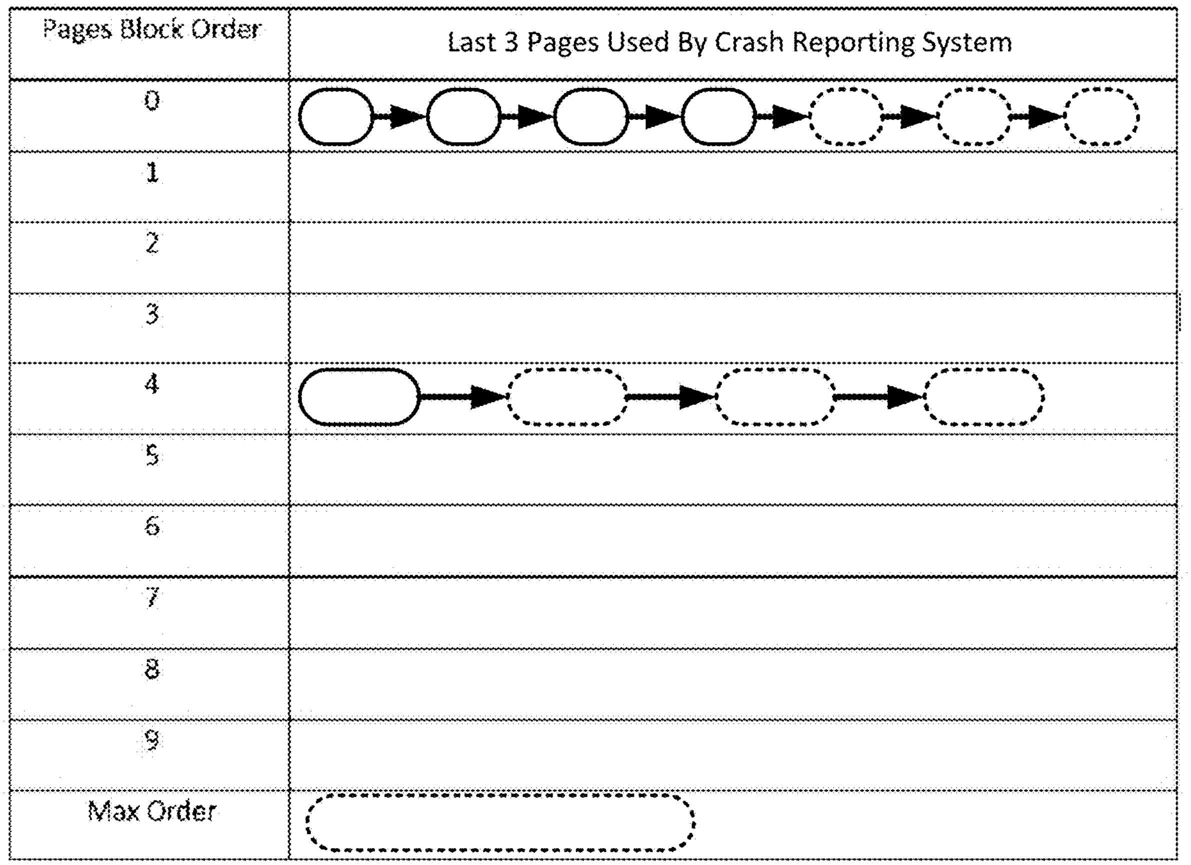
FIG. 2 is a diagram illustrating designated memory areas in a memory allocator list.

FIG. 2 is a table 200 of designated memory areas in a memory allocator's lists. FIG. 2 shows how the last few entries are used to store the call trace data during a system panic. For example, table 200 shows the last three entries (distinguished by dotted lines) being utilized for crash data storage. The pages in FIG. 2 are ordered by block size.

In certain implementations, the crash reporting system enhances reliability by utilizing not only free pages in memory but also by duplicating crucial crash information in unallocated spaces on block devices and in the unused memory of reserved pages for Plug and Play (PnP) devices. For example, when a system crash occurs, the system may store duplicate copies of crash data, such as error logs and system states, in these otherwise unused or unallocated areas.

This redundancy ensures that even if one storage location is compromised or inaccessible, the crash data can still be retrieved from another location. Upon the next system startup, the crash reporting system is designed to scan these designated areas meticulously. The crash reporting system searches through the unallocated spaces on block devices, which may include sections of a hard drive or SSD that are not currently assigned to any file system, as well as the reserved memory pages of PnP devices, which are typically set aside for device-specific operations but remain unused during normal operations. The system then extracts the stored crash data from these locations and writes it to the file system, ensuring that the data is preserved and accessible for analysis. This process not only enhances the reliability of crash data retrieval but also maximizes the use of available system resources by leveraging otherwise idle memory and storage spaces.

In some aspects, the crash reporting system may then clear the signatures from the memory areas and block devices to avoid duplication in subsequent dumps. For example, once the system has retrieved and written the crash data to the file system, it will systematically erase any residual signatures or markers that were used to identify the crash data in the memory areas and block devices. These signatures might include specific identifiers or metadata that were initially placed to facilitate the quick location and retrieval of crash data. By clearing these signatures, the system ensures that these memory areas and block devices are reset and ready for future use, without the risk of mixing old data with new crash information. This approach not only optimizes the available storage by freeing up space but also maintains the integrity and clarity of crash reports, making it easier for system administrators and developers to analyze and address the root causes of system failures. Additionally, this practice helps in maintaining system performance by preventing the accumulation of outdated or redundant data, which could otherwise slow down the system or lead to storage inefficiencies.

Figure 3:
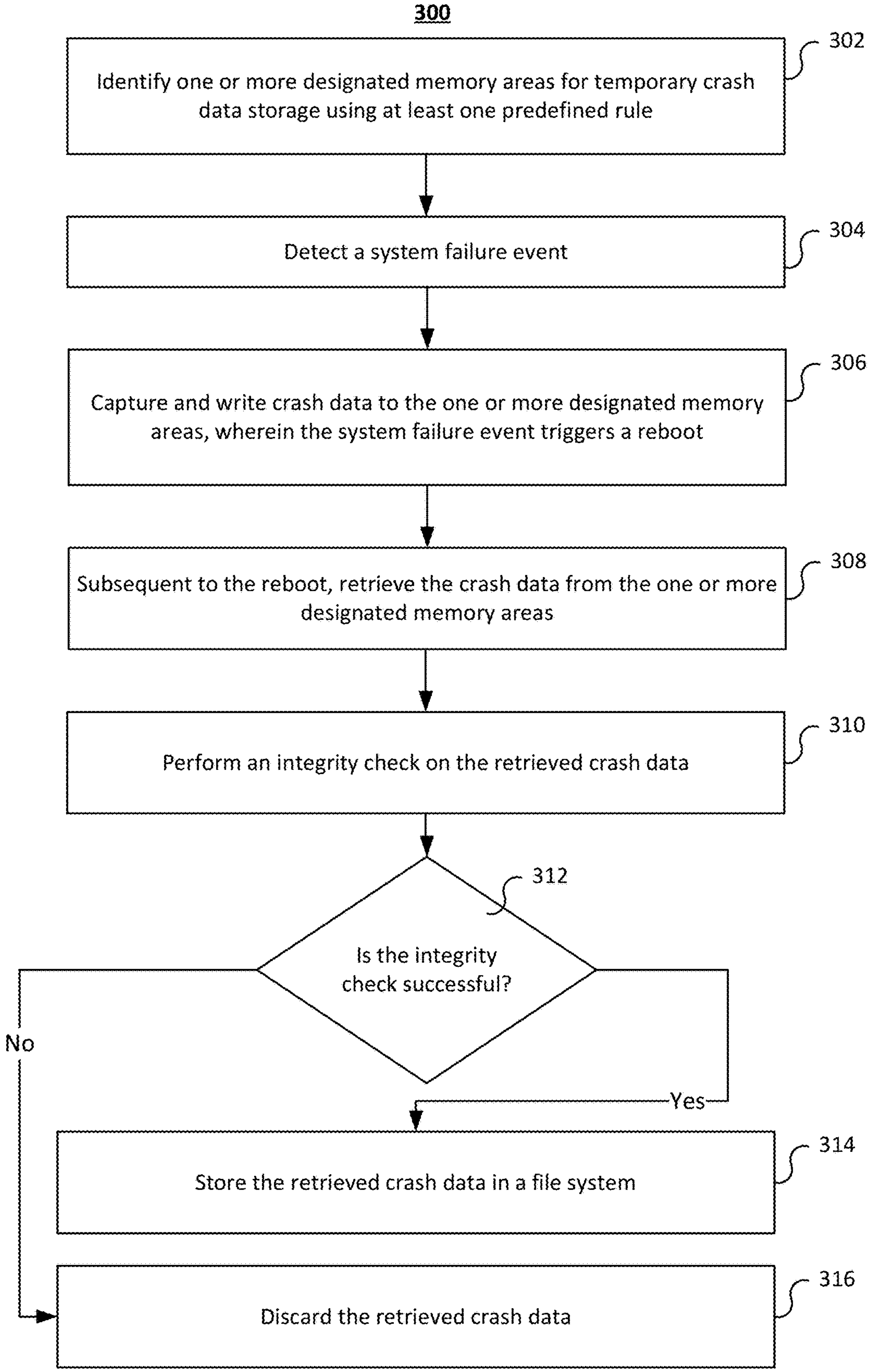
FIG. 3 illustrates a flow diagram of a method for capturing crash artifacts.

FIG. 3 illustrates a flow diagram of method 300 for capturing crash artifacts. At 302, a crash reporting system identifies one or more designated memory areas for temporary crash data storage using at least one predefined rule. As mentioned previously, a predefined rule may direct the crash reporting system to evaluate various memory areas based on different criteria and select the one or more designated memory areas as the areas that meet the criteria.

In some aspects, the one or more designated memory areas are selected across a plurality of nodes (e.g., node 102(1), node 102(N)) in a computing environment. For example, the one or more designated memory areas are a set of pages in each memory allocator list (e.g., BuddyAllocator's Lists 110(1), BuddyAllocator's Lists 110(N), etc.) across all the plurality of nodes. In a specific case, the set of pages are pages at an end of each memory allocator list (e.g., the last three pages). If a panic occurs in the unix system kernel, writing crash artifacts to the file system will most likely be unavailable, while writing to the one or more designated memory areas (e.g., RAM) is available in any state of the operating system.

At 304, the crash reporting system detects a system failure event (e.g., a system panic). In some aspects, the system failure event occurs at a first node (e.g., node 102(1)) of the plurality of nodes. The system failure event may further trigger a reboot. In some aspects, the reboot is a warm reboot on a computing device. In some aspects, the reboot is a guest operating system reboot of a virtual machine and a hypervisor performs consistent memory allocation for the virtual machine.

Due to the warm reboot and/or the consistent memory allocation, at 306, the crash reporting system is able to capture and write crash data to the one or more designated memory areas (i.e., the one or more designated memory areas should be able to retain their data without alteration).

At 308, subsequent to the reboot, the crash reporting system retrieves the crash data from the one or more designated memory areas.

At 310, the crash reporting system performs an integrity check on the retrieved crash data. The integrity check involves verifying that the crash data has not been altered, corrupted, or lost during the system failure and subsequent reboot. In some aspects, the integrity check may include calculating and comparing checksums or hash values that were generated and stored with the crash data at the time of capture. By matching these values with those recalculated upon retrieval, the crash reporting system can confirm that the data remains intact and unmodified. Additionally, the integrity check may involve validating the completeness of the data, ensuring that all expected data segments are present and correctly formatted. Only after the data passes these verification steps is it deemed reliable enough to be stored permanently in the file system, thereby maintaining the integrity and usefulness of the crash data for future analysis and troubleshooting.

In response to determining that the integrity check is successful, method 300 advances to 314, where the crash reporting system stores the retrieved crash data in a file system. In some aspects, the retrieved crash data is stored in a storage location within the file system as selected by a user.

In response to determining that the integrity check is unsuccessful, method 300 advances to 316, wherein the retrieved crash data is discarded because it is unreliable.

In some aspects, after steps 314 and 316, the crash reporting system may prevent redundant data storage by clearing signatures of the crash data from the one or more designated memory areas. For example, the signatures may be one or more of: data integrity markers, unique identifiers, metadata, and security tokens of the crash data.

Figure 4:
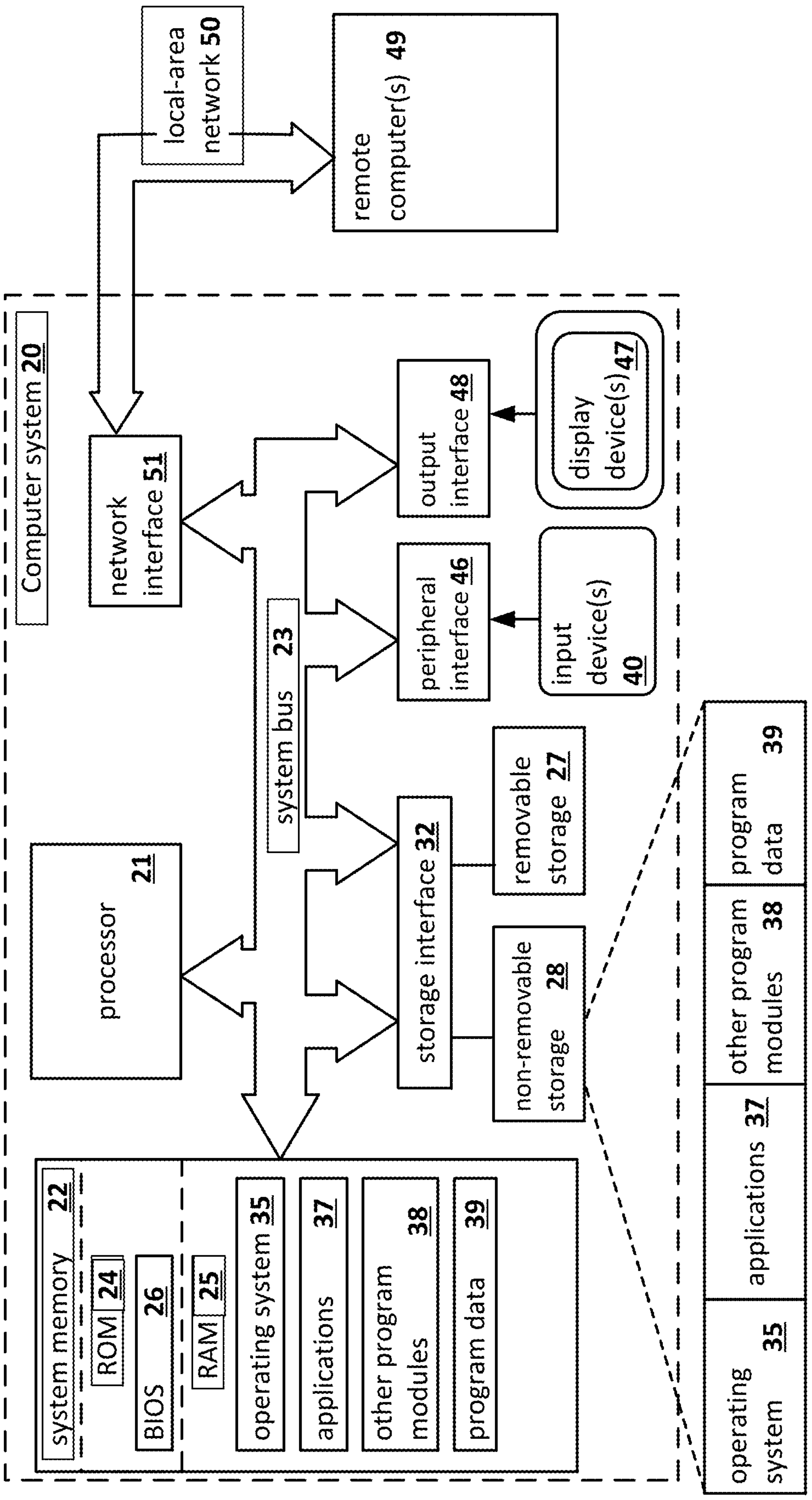
FIG. 4 presents an example of a general-purpose computer system on which aspects of the present disclosure can be implemented.

FIG. 4 is a block diagram illustrating a computer system 20 on which aspects of systems and methods for crashing reporting in computing environments may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, $I^2C$, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-3 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter.

In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort may be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for crash artifact storage and retrieval, the method comprising:

identifying one or more designated memory areas for temporary crash data storage using at least one predefined rule;

in response to detecting a system failure event, capturing and writing crash data to the one or more designated memory areas, wherein the system failure event triggers a reboot;

subsequent to the reboot, retrieving the crash data from the one or more designated memory areas;

performing an integrity check on the retrieved crash data;

in response to determining that the integrity check is successful, storing the retrieved crash data in a file system; and clearing signatures of the crash data from the one or more designated memory areas to prevent redundant data storage.

2. The method of claim 1, wherein the signatures comprise one or more of: data integrity markers, unique identifiers, metadata, and security tokens of the crash data.

3. The method of claim 1, wherein the one or more designated memory areas are located across a plurality of nodes in a computing environment, and wherein the system failure event occurs at a first node of the plurality of nodes.

4. The method of claim 3, wherein the one or more designated memory areas are a set of pages in each memory allocator list across all the plurality of nodes.

5. The method of claim 4, wherein the set of pages are pages at an end of each memory allocator list.

6. The method of claim 1, wherein the reboot is a warm reboot on a computing device.

7. The method of claim 1, wherein the reboot is a guest operating system reboot of a virtual machine and a hypervisor performs consistent memory allocation for the virtual machine.

8. The method of claim 1, wherein the retrieved crash data is stored in a storage location within the file system as selected by a user.

9. The method of claim 1, wherein the system failure event is a system panic.

10. A system for crash artifact storage and retrieval, comprising:

at least one memory; and at least one hardware processor coupled with the at least one memory and configured, individually or in combination, to:

identify, in the at least one memory, one or more designated memory areas for temporary crash data storage using at least one predefined rule;

in response to detecting a system failure event, capture and write crash data to the one or more designated memory areas, wherein the system failure event triggers a reboot;

subsequent to the reboot, retrieve the crash data from the one or more designated memory areas;

perform an integrity check on the retrieved crash data;

in response to determining that the integrity check is successful, store the retrieved crash data in a file system; and clear signatures of the crash data from the one or more designated memory areas to prevent redundant data storage.

11. The system of claim 10, wherein the signatures comprise one or more of: data integrity markers, unique identifiers, metadata, and security tokens of the crash data.

12. The system of claim 10, wherein the one or more designated memory areas are located across a plurality of nodes in a computing environment, and wherein the system failure event occurs at a first node of the plurality of nodes.

13. The system of claim 12, wherein the one or more designated memory areas are a set of pages in each memory allocator list across all the plurality of nodes.

14. The system of claim 13, wherein the set of pages are pages at an end of each memory allocator list.

15. The system of claim 10, wherein the reboot is a warm reboot on a computing device.

16. The system of claim 10, wherein the reboot is a guest operating system reboot of a virtual machine and a hypervisor performs consistent memory allocation for the virtual machine.

17. The system of claim 10, wherein the retrieved crash data is stored in a storage location within the file system as selected by a user.

18. A non-transitory computer readable medium storing thereon computer executable instructions for crash artifact storage and retrieval, including instructions for:

identifying one or more designated memory areas for temporary crash data storage using at least one predefined rule;

in response to detecting a system failure event, capturing and writing crash data to the one or more designated memory areas, wherein the system failure event triggers a reboot;

subsequent to the reboot, retrieving the crash data from the one or more designated memory areas;

performing an integrity check on the retrieved crash data;

in response to determining that the integrity check is successful, storing the retrieved crash data in a file system; and clearing signatures of the crash data from the one or more designated memory areas to prevent redundant data storage.

* * * * *